US010566297B2

(12) United States Patent
Rodbell et al.

(10) Patent No.: US 10,566,297 B2
(45) Date of Patent: Feb. 18, 2020

(54) MONOLITHIC INTEGRATION OF III-V CELLS FOR POWERING MEMORY ERASURE DEVICES (71) Applicant: International Business Machines Corporation, Armonk, NY (US)

(72) Inventors: Kenneth Rodbell, Sandy Hook, CT (US); Davood Shahrjerdi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/725,742

(22) Filed: Oct. 5, 2017

(65) Prior Publication Data
US 2018/0033906 A1 Feb. 1, 2018

Related U.S. Application Data (62) Division of application No. 14/994,267, filed on Jan. 13, 2016, now Pat. No. 9,997,475.

(51) Int. Cl.
H01L 23/00 (2006.01)
H01L 31/18 (2006.01)
(Continued)

(52) U.S. Cl.
CPC ............ H01L 23/573 (2013.01); G06F 21/87 (2013.01); H01L 27/142 (2013.01); H01L 27/1443 (2013.01); H01L 31/0693 (2013.01); H01L 31/1852 (2013.01); H01L 31/1892 (2013.01); G06F 2221/2143 (2013.01); Y02E 10/544 (2013.01); Y02P 70/521 (2015.11)

(58) Field of Classification Search
CPC ............... H01L 23/573; H01L 27/1443; H01L 31/1892; H01L 31/0693; H01L 27/142; H01L 31/1852; G06F 21/87; G06F 2221/2143; Y02E 10/544
See application file for complete search history.

(56) References Cited

U.S. PATENT DOCUMENTS 8,981,449 B2  3/2015 Bedell et al.
9,559,229 B2  1/2017 Chen
(Continued)

OTHER PUBLICATIONS

List of IBM Patents or Patent Applications Treated as Related; (Appendix P), Filed Oct. 5, 2017; 2 pages.
(Continued)

Primary Examiner — Hoang-Quan T Ho
(74) Attorney, Agent, or Firm — Cantor Colburn LLP; L. Jeffrey Kelly (57) ABSTRACT A method for making a photovoltaic device is provided that includes the steps of providing a silicon substrate having a complementary metal-oxide semiconductor ("CMOS"); bonding a first layer of silicon oxide to a second layer of silicon oxide wherein the bonded layers are deposited on the silicon substrate; and forming a III-V photovoltaic cell on a side of the bonded silicon oxide layers opposite the silicon substrate, wherein when the III-V photovoltaic cell is exposed to radiation, the III-V photovoltaic cell generates a current that powers a memory erasure device to cause an alteration of a memory state of a memory cell in an integrated circuit.

17 Claims, 4 Drawing Sheets (51) Int. Cl.
  *H01L 31/0693* (2012.01)
  *G06F 21/87* (2013.01)
  *H01L 27/142* (2014.01)
  *H01L 27/144* (2006.01)

(56) References Cited

U.S. PATENT DOCUMENTS

| | | | |
|---|---|---|---|
| 9,799,419 B2 | 10/2017 | Cabauy et al. | |
| 9,934,967 B2 | 4/2018 | Hydrick et al. | |
| 9,997,475 B2 | 6/2018 | Rodbell et al. | |
| 2003/0173612 A1 | 9/2003 | Krieger et al. | |
| 2007/0069246 A1 | 3/2007 | Koch et al. | |
| 2008/0257409 A1* | 10/2008 | Li | H01L 31/0693 136/259 |
| 2011/0272014 A1* | 11/2011 | Mathai | H01L 31/035281 136/255 |
| 2012/0015163 A1* | 1/2012 | He | H01L 21/6835 428/212 |
| 2014/0103286 A1 | 4/2014 | Chu et al. | |
| 2014/0103485 A1 | 4/2014 | Fritz et al. | |
| 2014/0103957 A1* | 4/2014 | Fritz | H01L 27/24 326/8 |
| 2014/0252448 A1* | 9/2014 | Bedell | H01L 29/788 257/316 |
| 2014/0349448 A1 | 11/2014 | Afzali-Ardakani et al. | |
| 2017/0117236 A1 | 4/2017 | Afzali-Ardakani et al. | |
| 2017/0117431 A1 | 4/2017 | Afzali-Ardakani et al. | |
| 2017/0200684 A1 | 7/2017 | Rodbell et al. | |
| 2018/0033906 A1 | 2/2018 | Rodbell et al. | |

OTHER PUBLICATIONS

Klaus, J. W., et al.; "Atomic Layer Deposition of Tungsten Using Sequential Surface Chemistry With a Sacrificial Stripping Reaction"; Thin Solid Films; vol. 360; pp. 145-153; 2000.

* cited by examiner

MONOLITHIC INTEGRATION OF III-V CELLS FOR POWERING MEMORY ERASURE DEVICES

DOMESTIC PRIORITY

This application is a Divisional of Non-Provisional application Ser. No. 14/994,267, entitled "MONOLITHIC INTEGRATION OF III-V CELLS FOR POWERING MEMORY ERASURE DEVICES", filed Jan. 13, 2016, the contents of which are incorporated by reference.

BACKGROUND

The present invention generally relates to photovoltaic solar cells, and more specifically, to integration of III-V cells for powering memory erasure devices.

A photovoltaic device is a device that converts the energy of incident photons to electrical power. Typical photovoltaic devices include solar cells, which are configured to convert the energy in the electromagnetic radiation from the Sun to electric energy. Each photon has an energy given by the formula $E=h\nu$, in which the energy $E$ is equal to the product of the Planck's constant $h$ and the frequency $\nu$ of the electromagnetic radiation associated with the photon.

Hardware based "Root of Trust" is a fundamental building block for any secure computing system. Key elements of secure computing require authentication, sending data to an authorized source, and/or loading data onto a designated device. In general, cryptographic keys in binary code form the basis of securing data and bit streams. Typically, such cryptographic keys are stored in non-volatile memory and are present on an integrated circuit (IC) at all times. If an attacker can extract the key from a device, the entire foundation for secure computing is in jeopardy. For example, an attacker with physical access to a device can delayer the chip and read out the stored code based on the state of the transistors. Thus, securing cryptographic keys requires anti-tamper technologies. For example, an anti-tamper mesh may surround a printed circuit board and may include a tamper sensor chip and its own battery pack to deter such attacks. If the sensor detects that the mesh is being cut, the cryptographic code is erased. However, such anti-tamper technologies may be relatively expensive and may therefore not be suitable for implementation in mass produced, cost sensitive devices like field programmable gate arrays (FPGAs), mobile devices, and sensors.

SUMMARY

In an embodiment of the invention, a method for making a photovoltaic device is provided that includes the steps of providing a silicon substrate having a complementary metal-oxide semiconductor ("CMOS"); bonding a first layer of silicon oxide to a second layer of silicon oxide wherein the bonded layers are deposited on the silicon substrate; and forming a III-V photovoltaic cell on a side of the bonded silicon oxide layers opposite the silicon substrate, wherein when the III-V photovoltaic cell is exposed to radiation, the III-V photovoltaic cell generates a current that powers a memory erasure device to cause an alteration of a memory state of a memory cell in an integrated circuit.

In another embodiment of the invention, a method for making a photovoltaic device is provided that includes the steps of low-temperature bonding of a III-V wafer containing an extremely thin epitaxial template layer; selective removal of a sacrificial release layer or full removal of a III-V substrate; deposition and patterning oxide trenches; selective epitaxial growth of a III-V photovoltaic cell; and planarization and deposition of a transparent conducting layer.

In another embodiment of the invention, a photovoltaic device is provided that includes a silicon substrate comprising a complementary metal-oxide semiconductor ("CMOS"); a first layer of silicon oxide bonded to a second layer of silicon oxide wherein the bonded layers are deposited on the silicon substrate; and a III-V photovoltaic cell on a side of the bonded silicon oxide layers opposite the silicon substrate, wherein when the III-V photovoltaic cell is exposed to radiation, the III-V photovoltaic cell generates a current that powers a memory erasure device to cause an alteration of a memory state of a memory cell in an integrated circuit.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure present a novel on-chip anti tamper device for detecting physical tampering as well as for providing a tamper response by erasure of data. Exemplary components include miniaturized photovoltaic cells (PV) integrated into the back end of the line (or backend) interconnect structure at various levels, non-volatile memory (NVM) (e.g., phase change memory (PCM)) to store sensitive data, such as secret authentication codes, and a memory erasure device (MED) In one embodiment, the MED comprises an embedded reactive material, which may comprise a multilayer thin film metal stack that reacts when triggered by a current pulse generated from the photovoltaic (PV) elements. Notably, many physical reverse engineering techniques require accessing the chip structures through imaging (e.g., electron beams from scanning electron microscopy (SEM), focused ion beam (FIB), x-ray, etc.) and therefore generate radiation (e.g., photocurrent, laser beam induced current (LBIC), electron beam induced current (EBIC), and the like). Embodiments of the present disclosure exploit this principle by using the miniature photovoltaic cells to convert the radiation from a tampering attempt into a current which triggers the tamper response (e.g., either directly or through an exothermic reaction generated in the reactive material) to erase the data.

Tampering/attacks range from electrical probing and delayering for extracting secret keys to inducing faults (e.g. flipping states) in order to force an integrated circuit to conduct unauthorized operations. An attacker typically needs to deploy a range of techniques in order to locate specific circuits and structures which usually involve radiation for imaging or inducing currents and faults. Table 1 illustrates several failure analysis/tampering techniques.

TABLE 1

| Failure Analysis technique | Radiation involved |
|---|---|
| Delayering by ashing, polishing | Requires optical microscope to stop at a specific layer |
| Single and dual beam focus ion beam | Ga ion beam for FIB cuts (produce secondary electrons) Scanning electron microscope (e-beam up to 30 KeV) |
| Electron beam induced current (EBIC), electron beam probing | Scanning electron microscope (e-beam up to 30 KeV) |
| Laser techniques: laser voltage probing, optical beam induced current (OBIC), thermal e.g. optical beam induced resistance change (OBIRCH) | Lasers wavelength up to 1.3 microns |
| X-Ray tomography | X-Ray ranging from 50-200 keV |

Embodiments of the present disclosure are compatible with standard metal oxide semiconductor (MOS) chip fabrication techniques, thereby reducing the cost per die during implementation and integration of such embodiments. Furthermore, the security against physical tampering is increased compared to packaging based approaches due to miniaturization and containment within the chip. In addition, the on-chip anti-tamper devices of the present disclosure may also be implemented with established hardware security products.

As stated above, the present invention relates to photovoltaic solar cells, and particularly to integration of III-V cells for powering memory erasure devices, which are now described in detail with accompanying figures. These novel integrated cells provide excellent anti-tampering devices. Further the III-V cells can be tuned to various wavelengths of radiation. It is noted that like reference numerals refer to like elements across different embodiments.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

As used herein, a "photovoltaic device" is a device, such as a solar cell, that produces free electrons-hole pairs, when exposed to radiation, such as light, and can be collected to produce an electric current. The photovoltaic device typically includes layers of p-type conductivity and n-type conductivity that share an interface to provide a junction. The "absorption layer" of the photovoltaic device is the material that readily absorbs photons to generate charge carriers, i.e., free electrons or holes. A portion of the photovoltaic device, between the front side and the junction is referred to as the "buffer layer", and the junction is referred to as the "buffer junction." The buffer layer may be present atop the absorption layer, in which the buffer layer has a conductivity type that is opposite the conductivity type as the absorption layer. In one example, when the Sun's energy in the form of photons collects in the cell layers, electron-hole pairs are generated in the material within the photovoltaic device. The buffer junction provides the required electric field for the collection of the photo-generated holes and electrons on the p-doped and n-doped sides of the buffer junction, respectively. In many examples, at least one p-type layer of the photovoltaic device may provide the absorption layer, and at least one adjacent n-type layer may provide the buffer layer.

While some embodiments of the present disclosure may employ other types of non-volatile memory, phase change memory has particular advantages which make it a suitable choice for use in a secure device according to the present disclosure. More specifically, from a physical anti-tamper perspective phase change memory does not give off any electromagnetic signature. Therefore, reading out the memory states can only be accomplished by direct probing and imaging, which requires physical access to the phase change memory. Once a reactive material has ignited and melted the phase change memory, there is no way to read out the bits since the physical attributes of the material have been changed. This is different from SRAM and other technologies, where it is possible to read out the last state due to imprinting, even after the chip power is turned off. On the other hand, metal oxide semiconductor based memory cells may be advantageous in some application because metals, such as aluminum (which may be used in exemplary reactive materials), cause significant reactions with dielectrics such as silicon dioxide, silicon nitride, and high-K gate dielectrics, reacting with oxygen and forming stable oxides. Thus, there is significant potential for extensive gate/memory cell destruction when such materials are used.

In one embodiment the MED comprises a reactive material. An exothermic reaction of the reactive material is triggered by a current from a photovoltaic cell. Here, the inventive photovoltaic solar cell comprises a III-V cell structure. As used herein "III" refers to the IUPAC Group 13 class of elements on the periodic table that is also known as the Boron group. Group III is a historical name of this class of elements characterized by having three electrons in their outer energy levels (valence layers). As used herein, Group III elements comprise boron (B), aluminum (Al), gallium (Ga), indium (In), thallium (Tl), and ununtrium (Uut).

As used herein "V" refers to the IUPAC Group 15 class of elements on the periodic table that is also known as the Nitrogen group. The "five" ("V") in the historical name comes from the "pentavalency" of nitrogen, reflected by the stoichiometry of compounds such as $N_2O_5$. As used herein, Group V elements comprise nitrogen (N), phosphorus (P), arsenic (As), antimony (Sb), bismuth (Bi) and the synthetic element ununpentium (Uup) (unconfirmed).

Compound semiconductors are attractive for co-integration with a complementary metal-oxide semiconductor ("CMOS") owing to their potentially attainable high conversion efficiency while utilizing a reasonably thin absorber layer. However, the direct growth of high-quality compound semiconductors on silicon has long been challenging. Here, the instant method to integrate III-V cells with CMOS is to create thin-film devices utilizing a suitable layer transfer method and subsequently attach a surrogate CMOS chip. In one embodiment, the method comprises a variant of epitaxial layer lift-off (ELO) that involves the selective removal of a sacrificial layer, which is embedded between the device layer and the host substrate.

Figure 1:
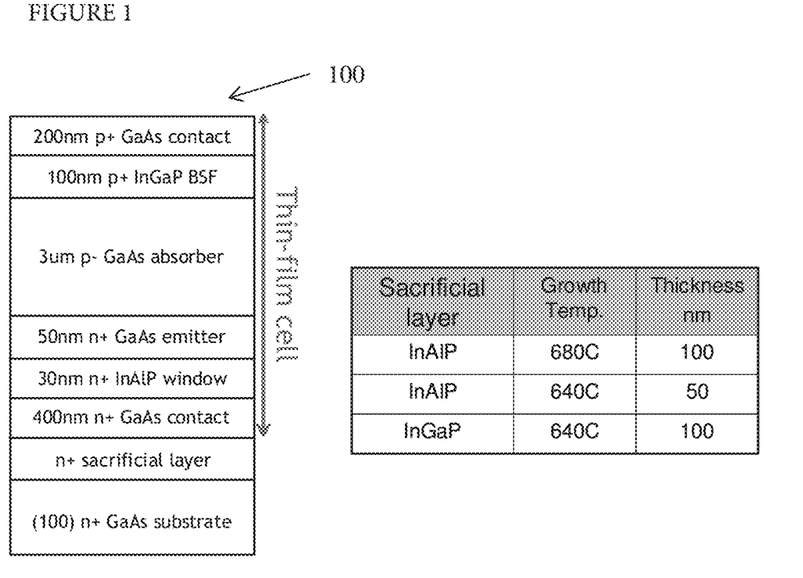
FIG. 1 shows a schematic of an embodiment of an inverted single-junction GaAs solar cell and the summary of the examined embedded sacrificial layers.

In one embodiment the solar cell comprises a single junction GaAs cells with an embedded sacrificial layer. Single junction GaAs solar cell devices are theoretically predicted to achieve the highest conversion efficiency. In one embodiment of a process for integrating the solar cell device with the CMOS chip, an inverted GaAs device structure is grown. Two different release layers, InGaP and InAlP, were used for producing thin-film GaAs solar cells. FIG. 1 schematically illustrates the device structure for an inverted GaAs solar cell 100 with an embedded sacrificial layer. The table in FIG. 1 additionally provides the processing details for the examined sacrificial layers, in which the growth temperature and the thickness of the sacrificial layer were varied while the growth condition of the solar cell was identical in all experiments.

Two structures were initially grown utilizing lattice-matched InAlP films as the release layers. The solar cell devices were grown under identical conditions with the exception of the growth temperature for the InAlP layers. After the epitaxial growth of the structures, the samples were immersed in a concentrated hydrochloric acid (HCl). It was found that the InAlP layer grown at the lower temperature of 640° C. was fully etched in the concentrated HCl solution, resulting in the release of the device structure. However, the sample consisting of the high-temperature InAlP layer (680° C.) remained unchanged upon the exposure to the HCl solution. Furthermore, an additional solar cell structure was grown utilizing a lattice-matched InGaP sacrificial layer and subsequently immersed in the HCl solution. However, the devices with the InGaP layer did not separate from the host GaAs substrate upon their immersion in the solution for elongated times in excess of 12 hrs. A short-loop device fabrication process was additionally devised aiming to quickly evaluate the electrical properties of different solar cell devices. The open circuit voltage ($V_{oc}$) was used as the key figure of merit for evaluating the epitaxial quality of the cells. The $V_{oc}$ was examined primarily because of its extreme sensitivity to the epitaxial defects that give rise to an increased dark current. The $V_{oc}$ of all three structures was found to be in excess of 900 mV, indicating the good quality of the epitaxial films.

Figure 2:
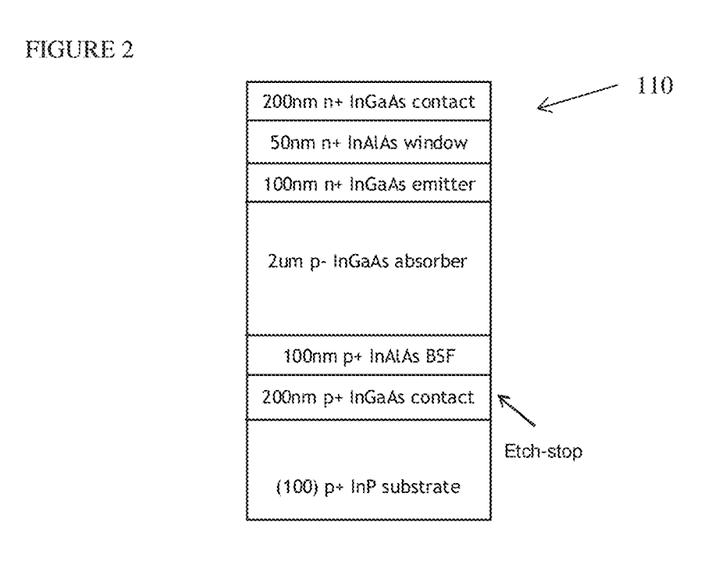
FIG. 2 shows a schematic of an embodiment of an upright single junction GaAs solar cell.

In another embodiment, the solar cell comprises a single junction InGaAs solar cell tuned for the infrared ("IR") spectrum. The narrow energy bandgap of InGaAs extends the cutoff absorption wavelength of the solar cells to about 1630 nm. The device structure was grown on InP substrates because of its matched lattice constant to that of InP. Once the device structure is grown, the substrate is subsequently removed selectively with respect to the InGaAs in order to produce thin-film solar cells. FIG. 2 shows the schematic illustration of the InGaAs solar cell 110, grown using metal oxide chemical vapor deposition ("MOCVD"). The preliminary results indicate the successful removal of the InP substrate with respect to the solar cell structure. However, further calibration should mitigate the observed anomalous wafer-to-wafer variability. Nevertheless, the preliminary results from the 'best' solar cell devices are promising, where the $V_{oc}$ of the best cells was found to be in excess of 420 mV. The development of an inverted structure will further allow the subsequent transfer and integration with the surrogate CMOS chip.

Figure 3:
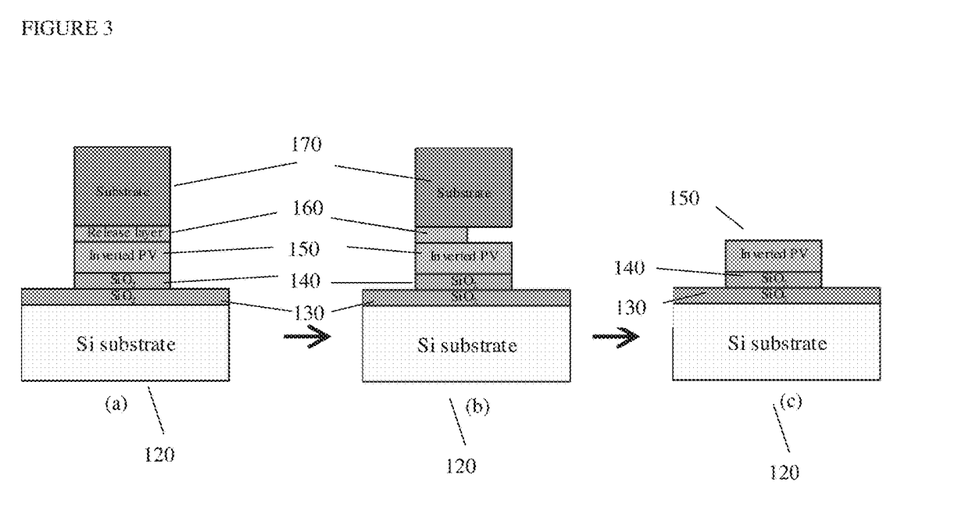
FIG. 3 shows a schematic illustration of the photovoltaic integration with silicon involving (a) low-temperature bonding of the photovoltaic onto silicon followed by (b) selective removal of the sacrificial release layer, resulting in (c) thin-film photovoltaic on silicon.

In one embodiment, the III-V cells are attached to a surrogate silicon substrate. As shown in FIG. 3, a silicon substrate 120 is provided. In one embodiment, the silicon substrate 120 comprises a CMOS chip. A first silicon oxide layer 130 is provided on top of the silicon substrate. A second silicon oxide layer 140 is bonded to the first silicon oxide layer 130. An inverted III-V photovoltaic cell 150 is provided on a side of the bonded silicon oxide layers 130, 140 opposite the silicon substrate 120. In one embodiment, the inverted III-V photovoltaic cell 150 comprises GaAs. In one embodiment, the inverted III-V photovoltaic cell 150 is in electrical contact with the CMOS. Such contact can made through external wiring or internally through vias, traces, and the like. A release layer 160 is provided on a side of the inverted III-V photovoltaic cell 150 opposite the bonded silicon oxide layers 130, 140. A substrate "handler" layer 170 is provided on a side of the release layer 160 opposite the inverted III-V photovoltaic cell 150.

FIG. 3 schematically illustrates one exemplary method to obtain thin-film photovoltaic cell on silicon. This embodiment comprises the step of a low-temperature plasma assisted bonding of the inverted photovoltaic devices 150 onto an oxide-coated silicon 120, 130, 140. This embodiment further comprises the step of releasing the inverted III-V photovoltaic device 150 using the ELO process. The release layer 160 is etched and removed. The substrate layer is mechanically removed 170. In one embodiment, the bonding process results in a thin bond line, preferably atomically thin. In another embodiment, in addition to the oxide-oxide bonding scheme, a eutectic metal bonding approach is used as well to allow the formation of the metal electrodes on the opposite sides of the device, which could lead to a potentially simpler integration scheme.

Figure 4:
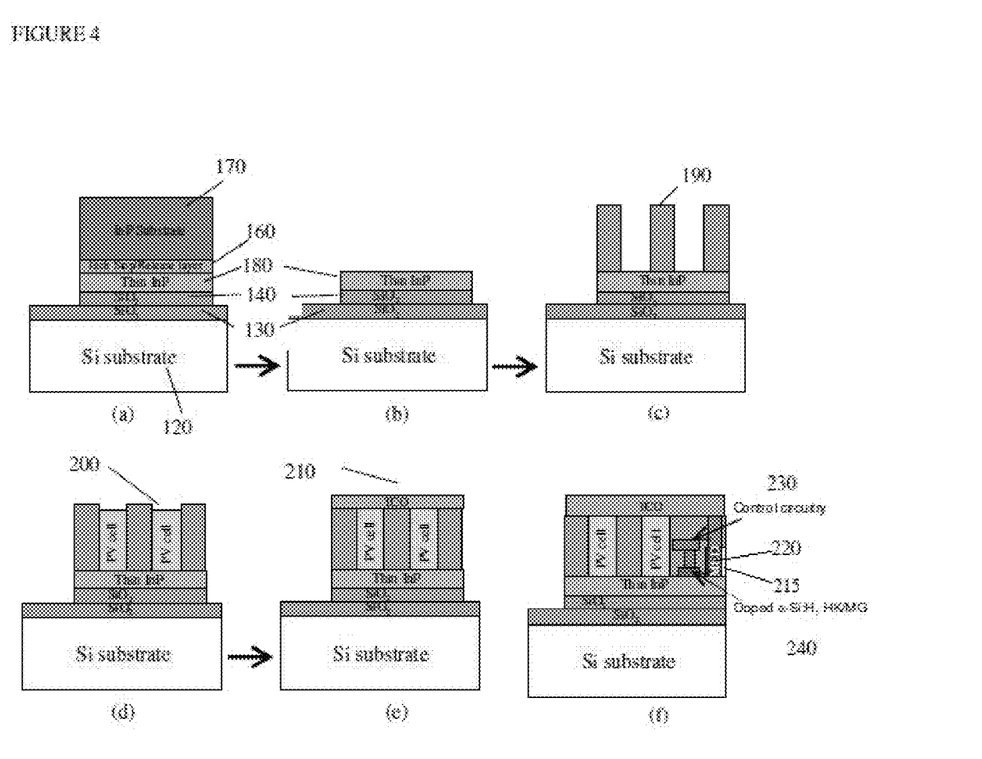
FIG. 4 shows a schematic illustration of the photovoltaic integration with silicon involving (a) low-temperature bonding of a III-V wafer containing an extremely thin epitaxial template layer, (b) selective removal of the sacrificial release layer or full removal of the III-V substrate, (c) deposition and patterning oxide trenches, (d) selective epitaxial growth of the PV cell, and (e) planarization and deposition of the transparent conducting layer (ITO, ZnO, graphene, CNTs). (f) Exemplary structure showing a JFET and a depletion-mode FET fabricated on the InP epitaxial template layer.

In another embodiment, an alternative integration scheme and device structure is disclosed, which tends to facilitate the integration of InGaAs photovoltaic cells on silicon. In the case of a GaAs photovoltaic device, the thin InP layer can be replaced by either thin Ge or other III-V cells that are lattice-matched with GaAs. The process starts with the bonding of an extremely thin (about 5 to about 50 nm) heavily doped InP layer 180 on silicon 120, 130, 140. The thin InP layer 180 is formed using similar process flow described above. The process involves the low-temperature bonding of a III-V substrate containing the thin InP layer 180 onto a silicon wafer 120, 130, 140 followed by the ELO process or the full removal of the substrate 170 in order to leave behind the thin InP layer on silicon 120, 130, 140. The thin InP layer 180 provides several new device design possibilities including universal back access for connecting small photovoltaic cells that are distributed on the chip, fabrication of active switches such as junction gate field-effect transistors ("JFETs") or depletion mode FETs that are located between the MEDs and the photovoltaic cells, etc.

FIG. 4 schematically illustrates the process and some of the exemplary structures that can be achieved using this new process. A silicon substrate 120 is provided. In one embodiment, the silicon substrate 120 comprises a CMOS chip. A first silicon oxide layer 130 is provided on top of the silicon substrate. A second silicon oxide layer 140 is bonded to the first silicon oxide layer 130. A thin InP layer 180 is provided on a side of the bonded silicon oxide layers 130, 140 opposite the silicon substrate 120. A release layer 170 is provided on a side of the thin InP layer 180 opposite the bonded silicon oxide layers 130, 140. An InP substrate "handler" layer 170 is provided on a side of the release layer 160 opposite the thin InP layer 180.

Still referring to FIG. 4, the release layer 160 and InP substrate 170 are removed exposing the thin InP layer 180 on the silicon 120, 130, 140. Three columns of silicon oxide 190 are deposited on a side of the thin InP layer 180 opposite the bonded silicon oxide layers 130, 140 thereby forming two wells. III-V photovoltaic cells 200 are selectively epitaxially grown within the wells. A transparent conductive layer 210 is deposited on a side of the III-V photovoltaic cells 200 and silicon columns 190 opposite the thin InP layer 180. In an embodiment, the transparent conductive layer 210 comprises a transparent conductive oxide.

FIG. 4 also shows an exemplary structure that further comprises a memory cell 215, a memory erasure device 220, control circuitry 230, and a doped amorphous silica high K metal gate 240.

As disclosed herein, the methods produce monolithic single chip devices thus simplifying the manufacturing process.

In some embodiments, multiple photovoltaic cells are included at various layers and at various locations, random or otherwise, in the backend, or front end, of the integrated circuit. As such, different photovoltaic cells included in the integrated circuit may be formed at different times as each of the layers of the integrated circuit is fabricated. In this regard, it should be noted that any one or more of the steps of the method may be repeated or performed in a different order than as explicitly depicted in FIG. 3 and FIG. 4. In some embodiments, multiple photovoltaic cells are formed having different sizes, geometries, configurations or materials/compositions, resulting in different response from one another in response to various tampering techniques (e.g., different quantum efficiencies when exposed to the same wavelength radiation). In some embodiments, the reactive material and the photovoltaic cell may be electrically coupled through one or more vias and/or traces, and the like.

The photovoltaic cell, or the photovoltaic cell in conjunction with the reactive material, comprise a tamper response device for the integrated circuit. Radiation from tampering/probing techniques that is received at the photovoltaic cell generates a photocurrent from the photovoltaic cell to the reactive material or directly to the memory cell. The direct photocurrent, or heat from an exothermic reaction in the reactive material erases or changes a state of the memory cell, preventing extraction of any data previously stored in the memory cell.

In some embodiments, the reactive material is included in an integrated circuit which provides a way to store the required amount of energy for irreversible erasure of memory cells on the chip through an exothermic reaction. In particular, in many cases the radiation of a given tamper event may be insufficient to generate a large enough current pulse from one or more integrated photovoltaic cells to directly alter, e.g., erase or destroy, the non-volatile memory, whereas the reactive material may have a steep chemical gradient and require only an ultra-low trigger current to release the energy. In one embodiment, the exothermic reaction irreversibly destroys all or a portion of a non-volatile memory providing unmistakable evidence of tampering. In one embodiment, the reactive material is deposited in at least one continuous layer adjacent to the non-volatile memory or sufficiently close to alter the non-volatile memory, e.g., to change the memory state of the non-volatile memory or to damage or destroy it such that it is no longer useable as a memory.

In some embodiments, the reactive material comprises a thin metal film stack of several metallic layers. For example, the reactive material comprises one or more specific metals such as copper, copper oxide, aluminum, nickel, hafnium oxide, silicon, boron, titanium, cobalt, palladium, platinum, and/or other metallic structures. In one embodiment, the stack includes an aluminum layer sandwiched between two nickel layers. Advantageously, the reactive material stores energy on-chip that is benign during normal chip operations, but which can be triggered by a low current pulse. This is contrary to traditional tamper schemes with on-chip batteries requiring a constant power since the tamper detection and response circuitry has to be kept operational throughout the lifetime of the die. In addition, current based ignition is potentially only needed on a single site/contact of the reactive material. In particular, a reaction self-propagates in free standing foils and similarly will sustain a self-propagating reaction front on the chip. Furthermore, if the heat loss away from the reactive material to the surrounding chip environment quenches the reaction, bit erasure can still be accomplished by exothermic reaction in reactive material regions exposed to current flows. The current to drive the reaction without a self-sustaining reaction front is still lower the current required for direct bit erasure. For example, ignition current may be substantially lower than that required to directly reset the non-volatile memory (e.g., nano-amperes versus micro-amperes).

In various embodiments, the ignition temperature and heat of reaction are tuned/adjusted to requirements of the particular manufacturing environment. In particular, the reactive material is inert during processing and survive normal chip operation and stress tests, but is sensitive enough to ignite during tampering and provide sufficient heat to destroy or erase non-volatile memory cells. It has been shown, for example, that in a titanium/amorphous-silicon stack, with a bilayer spacing of 75 nm deposited on 1 μm of silicon oxide on silicon, the reaction quenches when the reactive material thickness is less than 2.25 μm. Thus, in some embodiments the potential for reaction quenching is taken into account in providing a reactive material that generates a sufficient reaction front that will not be quenched prior to destroying the non-volatile memory. In some cases, the ignition threshold and heat of the reaction is varied by changing of the chemistry, stoichiometry, and microstructure (grain structure and line spacing in thin films comprising the stack of reactive material). For instance, the number of layers, the spacing between layers, the width of the layers and the component metals in the stack of reactive material, can all be varied, resulting in different ignition fluences (current densities required for ignition), different reaction heats, etc. In some embodiments, the ignition current density can also be varied via lithography, such as by varying of the size of the electrical contacts/vias connected to the stack of reactive material. For example, a connection from a first photovoltaic cell may be fabricated with electrical contacts having a different cross-sectional area than electrical contacts for a connection from a second photovoltaic cell. Accordingly, the current densities delivered from the first and second photovoltaic cells may be different from one another despite, for example, the first and second photovoltaic cells being otherwise the same and receiving the same incident radiation. Similarly, in embodiments employing oxide systems, such oxides can be made porous by producing nanoparticles of different sizes. Likewise, the potential for reaction quenching can be reduced by fabricating specific patterns and geometries for the reactive material, or one or more layers thereof, through lithography, undercutting, chemical mechanical planarization, and other similar techniques, in order to promote self-propagation by reducing heat loss. For example, a multilayer, such as nickel-aluminum Ni/Al, can be grown by sputtering and evaporation. In any case, when the reactive material is triggered by a current pulse, the stack of reactive material reacts by spontaneous mixing to release a large quantity of heat through an exothermic reaction, without any pressure waves or gaseous byproducts.

In one embodiment, nickel/aluminum multilayers are used for the stack of reactive material, since such a reactive material can be ignited using a short, low-current electrical pulse. For example, a bilayer spacing is frequently used to characterize the microstructure of a multilayer reactive material. For Ni/Al multilayers, the bilayer spacing is defined as the thickness of one layer of nickel and one layer of aluminum. As one example, assuming a Ni/Al multilayer with a density of 5.09 g/cc, a heat capacity of 0.588 J/g/K, a resistivity of $1.3 \times 10^{-5}$ Ω-cm and a 51 nm bilayer spacing, the ignition temperature is 177° C. In addition, assuming that 50 nm electrodes are used to supply an ignition current, a 100 ns 1.5 pA pulse is sufficient, assuming a lossless environment. However, estimating 80% heat loss, an approximately 3.3 pA pulse of 100 ns will ignite the Ni/Al (since electrical energy scales as the square of the current). Notably, the reaction of the reactive material to various currents of various durations can be tuned by changing the film thickness, bilayer spacing and chemistry, as well as through lithographic variation of the contact area to the reactive material structure, which will vary the current density.

In addition to Ni+Al multilayers, suitable reactive material components and combinations include: Si+2B, Cu+Pd, Al+Ti, Si+Co, Ni+Ti, Co+Al, Al+Pt, and combination of the foregoing as well as $Al_3Ni_2$, halfnium oxide, copper, copper oxide and various other metal and/or metal oxide material platforms already used in metal oxide semiconductor manufacturing. It should be noted that the foregoing is provided by way of example only and not limitation. Thus, numerous other, further and different combinations of component materials may be incorporated into a multilayer reactive material in accordance with various embodiments of the present disclosure. Some exemplary reactive materials that may be used in embodiments of the present disclosure are described in "A Survey of Combustible Metals, Thermites, and Intermettalics for Pyrotechnic Applications", by S. H. Fischer and M. C. Grubelich, Sandia National Laboratories, $32^{nd}$ AIAA/ASME/SAE/ASEE Joint Propulsion Conference, Lake Buena Vista, Fla., 1996, which is incorporated by reference herein in its entirety. In this regard, it should be noted that although some embodiments describe a reactive material that comprises a multi-layer stack, the present disclosure is not so limited. Namely, in other, further and different embodiments, the reactive material may comprise a single layer or region of a single metal or other material, or may comprise a different mechanism for generating heat, such as a thermite mixture, a metal fuel (e.g., a metal oxidation reaction), an intermetallic arrangement other than a multi-layer stack, and the like. In other words, some embodiments may feature an intermetallic reaction whereas other embodiments may rely upon an exothermic reduction-oxidation reaction, or other mechanism to generate heat.

Reactions in such materials can be ignited by ignition fluencies in the range of, for example, 0.5-5 J/cm$^2$, for an approximately 100 μm spot size, or 5-900 J/cm$^2$, for an approximately 10 μm spot size (the size of electrical contacts delivering an ignition current). Typical interlayer/bilayer spacing is from approximately 2 nm to 200 nm. Reactive materials such as the above can produce heats of reaction ranging from approximately 150 calories per cubic centimeter (cal/cc) to approximately 2500 cal/cc or more. Exemplary multilayer reactive materials have been show to ignite at temperatures below 300° C. under certain conditions (e.g., Ni+Al), but can produce heat greater than 600° C. up to more than approximately 2800° C. Given that a phase change memory's amorphous state can be made crystalline at temperatures of approximately 400° C. (for an approximately 100 ns pulse), and that there are typically greater than 1000 PCM cells on a chip, the energy to ignite a reactive material is far less that that required to resistively heat each cell individually.

Various embodiments described herein relate to the use of reactive materials in conjunction with phase change memory. Depending upon the configuration of reactive material (e.g., component metal(s)/materials, dimensions, size of contact areas, anticipated tampering techniques, and hence expected ignition currents, etc.), the phase change memory (PCM) can be tuned for optimal use with the reactive material. For example, the doping level can be varied to change the PCM sensitivity to the heat of reaction of the reactive material.

In some embodiments, a reactive material is used in conjunction with CMOS based memory technology. For example, reactive materials may generate heat greater than approximately 1300° C., which is sufficient to cause device damage through reactions with dielectrics such as silicon oxide, silicon nitride and high-k/metal gate dielectrics. For instance, metals such as aluminum strongly react with oxygen to form stable oxides. In one embodiment, a reactive material is integrated between the N and P wells of a CMOS gate. As such, the heat from a reaction in the reactive material causes a short due to the destruction of the gate dielectric, causing the circuit element to discharge and thereby irreversibly erasing the state of the memory bit.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The methods depicted herein are just one example. There may be many variations to the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photovoltaic device comprising:
    a memory cell including:
        a silicon substrate comprising a complementary metal-oxide semiconductor ("CMOS"); and
        a first layer of silicon oxide bonded to a second layer of silicon oxide wherein the bonded layers are deposited on the silicon substrate;
    a III-V photovoltaic cell on a side of the bonded silicon oxide layers opposite the silicon substrate, wherein the photovoltaic device is a monolithic single crystal chip; and
    a memory erasure device connected to the III-V photovoltaic cell, the III-V photovoltaic cell to generate a current when the III-V photovoltaic cell is exposed to radiation, the current to power the memory erasure device to cause an alteration of a memory state of the memory cell.

2. The photovoltaic device of claim 1 wherein the III-V photovoltaic cell comprises a Group III element selected from the group consisting of boron (B), aluminum (Al), gallium (Ga), indium (In), thallium (Tl), and ununtrium (Uut) and a Group V element selected from the group consisting of nitrogen (N), phosphorus (P), arsenic (As), antimony (Sb), bismuth (Bi) and ununpentium (Uup).

3. The photovoltaic device of claim 1 wherein the memory erasure device comprises a reactive material comprising a thin metal film.

4. The photovoltaic device of claim 3 wherein the current generated by the photovoltaic cell triggers an exothermic reaction in the reactive material.

5. The photovoltaic device of claim 4 wherein a heat generated by the exothermic reaction in the reactive material alters the memory state of the memory cell.

6. The photovoltaic device of claim 1 wherein the memory erasure device comprises nickel, aluminum, titanium, copper, palladium, boron, platinum, copper oxide, hafnium oxide, or combinations thereof.

7. The photovoltaic device of claim 1 wherein the III-V photovoltaic cell comprises a thin III-V layer and an epitaxially grown III-V layer.

8. A photovoltaic device, comprising:
    a silicon substrate comprising a complementary metal-oxide semiconductor ("CMOS");
    a first layer of silicon oxide bonded to a second layer of silicon oxide wherein the bonded layers are deposited on the silicon substrate; and
    a III-V photovoltaic cell on a side of the bonded silicon oxide layers opposite the silicon substrate, wherein the photovoltaic device is a monolithic single crystal chip,
    wherein when the III-V photovoltaic cell is exposed to radiation, the III-V photovoltaic cell generates a current that powers a memory erasure device to cause an alteration of a memory state of a memory cell in an integrated circuit.

9. The photovoltaic device of claim 8 wherein the III-V photovoltaic cell comprises a Group III element selected from the group consisting of boron (B), aluminum (Al), gallium (Ga), indium (In), thallium (Tl), and ununtrium (Uut) and a Group V element selected from the group consisting of nitrogen (N), phosphorus (P), arsenic (As), antimony (Sb), bismuth (Bi) and ununpentium (Uup).

10. The photovoltaic device of claim 8 wherein the memory erasure device comprises a reactive material comprising a thin metal film.

11. The photovoltaic device of claim 10 wherein the current generated by the photovoltaic cell triggers an exothermic reaction in the reactive material.

12. The photovoltaic device of claim 11 wherein a heat generated by the exothermic reaction in the reactive material alters the memory state of the memory cell.

13. The photovoltaic device of claim 8 wherein the memory erasure device comprises nickel, aluminum, titanium, copper, palladium, boron, platinum, copper oxide, hafnium oxide, or combinations thereof.

14. The photovoltaic device of claim 8 wherein the memory cell comprises a phase change memory.

15. The photovoltaic device of claim 8 wherein the III-V photovoltaic cell comprises a thin III-V layer and an epitaxially grown III-V layer.

16. The photovoltaic device of claim 8 wherein the III-V photovoltaic cell is in electrical contact with the CMOS.

17. The photovoltaic device of claim 8 wherein the III-V photovoltaic cell is in electrical contact with the memory erasure device.

* * * * *